(12) United States Patent
Agarwal et al.

(10) Patent No.: US 9,246,982 B2
(45) Date of Patent: Jan. 26, 2016

(54) REDUCING NETWORK USAGE OF COMPUTING DEVICE

(75) Inventors: Sharad Agarwal, Seattle, WA (US); Christopher Riederer, New York, NY (US); Lenin Ravindranath Sivalingam, Redmond, WA (US); Jitendra Padhye, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 546 days.

(21) Appl. No.: 13/615,603

(22) Filed: Sep. 14, 2012

(65) Prior Publication Data
US 2014/0082214 A1 Mar. 20, 2014

(51) Int. Cl.
*G06F 15/173* (2006.01)
*H04L 29/08* (2006.01)

(52) U.S. Cl.
CPC .............. *H04L 67/06* (2013.01); *H04L 67/325* (2013.01); *H04L 67/34* (2013.01)

(58) Field of Classification Search
CPC . H04W 24/02; H04W 40/36; H04W 28/0289; H04W 36/22; H04W 4/003; H04W 40/248; H04W 4/18; H04W 52/0258; H04W 4/00; H04W 4/16; H04W 8/00; H04W 36/165; H04W 40/12; H04W 52/288; H04W 72/1242; G06F 2209/509; H04L 47/12; H04L 47/10; H04L 69/22; H04L 43/0876; H04L 43/0852; H04L 67/284
USPC ........................................................ 709/240
See application file for complete search history.

(56) References Cited

U.S. PATENT DOCUMENTS

| | | | |
|---|---|---|---|
| 6,330,598 B1 * | 12/2001 | Beckwith et al. ............. | 709/223 |
| 6,772,193 B1 | 8/2004 | Igawa et al. | |
| 7,346,896 B2 | 3/2008 | Kounik et al. | |
| 7,489,710 B2 | 2/2009 | Gupta et al. | |
| 7,953,857 B2 | 5/2011 | Short et al. | |
| 7,965,698 B2 | 6/2011 | Jung | |
| 8,024,462 B1 | 9/2011 | Zhu et al. | |
| 2005/0094665 A1 * | 5/2005 | Nalawadi et al. ............. | 370/468 |
| 2006/0015651 A1 * | 1/2006 | Freimuth ................ | G06F 13/30 709/250 |
| 2006/0039335 A1 | 2/2006 | Ono et al. | |
| 2009/0313640 A1 | 12/2009 | Liang et al. | |
| 2012/0023190 A1 * | 1/2012 | Backholm et al. ............ | 709/217 |
| 2013/0086146 A1 * | 4/2013 | Addala ............... | H04L 12/4625 709/203 |
| 2013/0173513 A1 * | 7/2013 | Chu ...................... | G06F 9/4443 706/14 |

OTHER PUBLICATIONS

Jan B. Pedersen et al, Resumable Java Bytecode—Process Mobility for the JVM, 2009, IOS Press, pp. 1-15.*
Yang Zhang et al, A Heterogeneous Auto-Offloading Framework Based on Web Browser for Resource-constrained Devices, 2009, IEEE, pp. 193-199.*

(Continued)

*Primary Examiner* — Dustin Nguyen
*Assistant Examiner* — Hao Nguyen
(74) *Attorney, Agent, or Firm* — Alin Corie; Sandy Swain; Micky Minhas

(57) ABSTRACT

Methods and systems for reducing network usage of a computing device are provided herein. The method includes receiving a network call relating to a network transfer from an application at an application programming interface of the computing device. The method also includes determining whether the network transfer is relevant to a current state of the application and procrastinating the network transfer if it is not relevant to the current state of the application.

12 Claims, 6 Drawing Sheets

(56) References Cited

OTHER PUBLICATIONS

Chun, et al., "CloneCloud: Elastic Execution Between Mobile Device and Cloud", In Proceedings of the EuroSys '11 Sixth Conference on Computer systems, Apr. 10, 2011, pp. 301-314.

"International Search Report & Written Opinion for PCT Patent Application No. PCT/US2013/058664", Mailed Date: Dec. 17, 2013, Filed Date: Sep. 9, 2013, 11 pages.

Cai, et al., "Delaying Transmissions in Data Communication Networks to Improve Transport-Layer Performance", Retrieved at <<http://ieeexplore.ieee.org/stamp/stamp.jsp?tp=&arnumber=5753556>>, : In the IEEE Journal on Selected Areas in Communications, vol. 29, No. 5, May 2011, pp. 12.

"Dynamically Providing Application Analytic Information", U.S. Appl. No. 13/429,451, filed Mar. 26, 2012, pp. 34.

* cited by examiner

400

REDUCING NETWORK USAGE OF COMPUTING DEVICE

BACKGROUND

The high cost of data transfers is an impediment to the widespread use of mobile computing devices. For example, in the case of mobile phones, the ratio of data plan cost to median income may be relatively high. Therefore, mobile phones with operating systems that are efficient in data consumption are highly desirable.

Several existing techniques attempt to mitigate the high cost of network transfers for mobile computing devices by providing for the efficient consumption of data. For example, compression, de-duplication, and other similar techniques may be used on network traffic sent to a particular mobile computing device. However, such techniques may not reduce the size of network transfers to an acceptable degree.

Another technique involves exposing network usage statistics by various applications to the user of a mobile computing device and allowing the user to change his behavior according to the data plan for the mobile computing device. However, this technique relies on active behavior monitoring on the part of the user and, thus, can be time-consuming for the user.

In addition, application programming interfaces (APIs) that reduce network usage may be provided to application developers. For example, an API that executes network transfers based on how many bytes are included in a user's data plan may be implemented into an application. However, it is often difficult for application developers to understand the use of such APIs in the context of specific applications.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

An embodiment provides a method for reducing network usage. The method includes receiving a network call relating to a network transfer from an application at an application programming interface of a computing device. The method also includes determining whether the network transfer is relevant to a current state of the application and procrastinating the network transfer if it is not relevant to the current state of the application.

Another embodiment provides a computing system for reducing network usage. The computing system includes a processor that is adapted to execute stored instructions and a system memory. The system memory includes code configured to analyze a network call from an application to determine whether a corresponding network transfer is relevant to a current state of the application. The system memory also includes code configured to procrastinate the network transfer if it is not relevant to the current state of the application.

In addition, another embodiment provides one or more computer-readable storage media including a number of instructions that, when executed by a processor, cause the processor to analyze a network call from an application to determine whether a corresponding network transfer is relevant to a current state of the application. The instructions also cause the processor to procrastinate the network transfer for a specified amount of time if it is not relevant to the current state of the application.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Numbers in the 100 series refer to features originally found in FIG. 1, numbers in the 200 series refer to features originally found in FIG. 2, numbers in the 300 series refer to features originally found in FIG. 3, and so on.

DETAILED DESCRIPTION

Embodiments described herein set forth a method and system for reducing the network usage of a computing device, such as a mobile computing device. This may be accomplished by procrastinating, i.e., delaying, a network transfer requested by an application for a specified amount of time. In addition, this may be accomplished by procrastinating a network transfer until the results of the network transfer are relevant to a current state of the application. For example, if a network transfer updates a specific part of a user interface (UI) of the application, the network call for the network transfer may not be executed until that part of the UI is currently visible to the user of the computing device.

Further, a network transfer may be executed such that only data that are relevant to the current state of the application are obtained. This may be accomplished by using a proxy application programming interface (API) to determine which data to download to the computing device based on the part of the UI that is currently visible to the user. Alternatively, this may be accomplished by performing a network offload procedure. The network offload procedure may include offloading the code of a network call corresponding to the network transfer to a datacenter, parsing the code of the network call to identify the code relating to the relevant data, executing the identified code in the datacenter, and sending the relevant data to the computing device.

Figure 1:
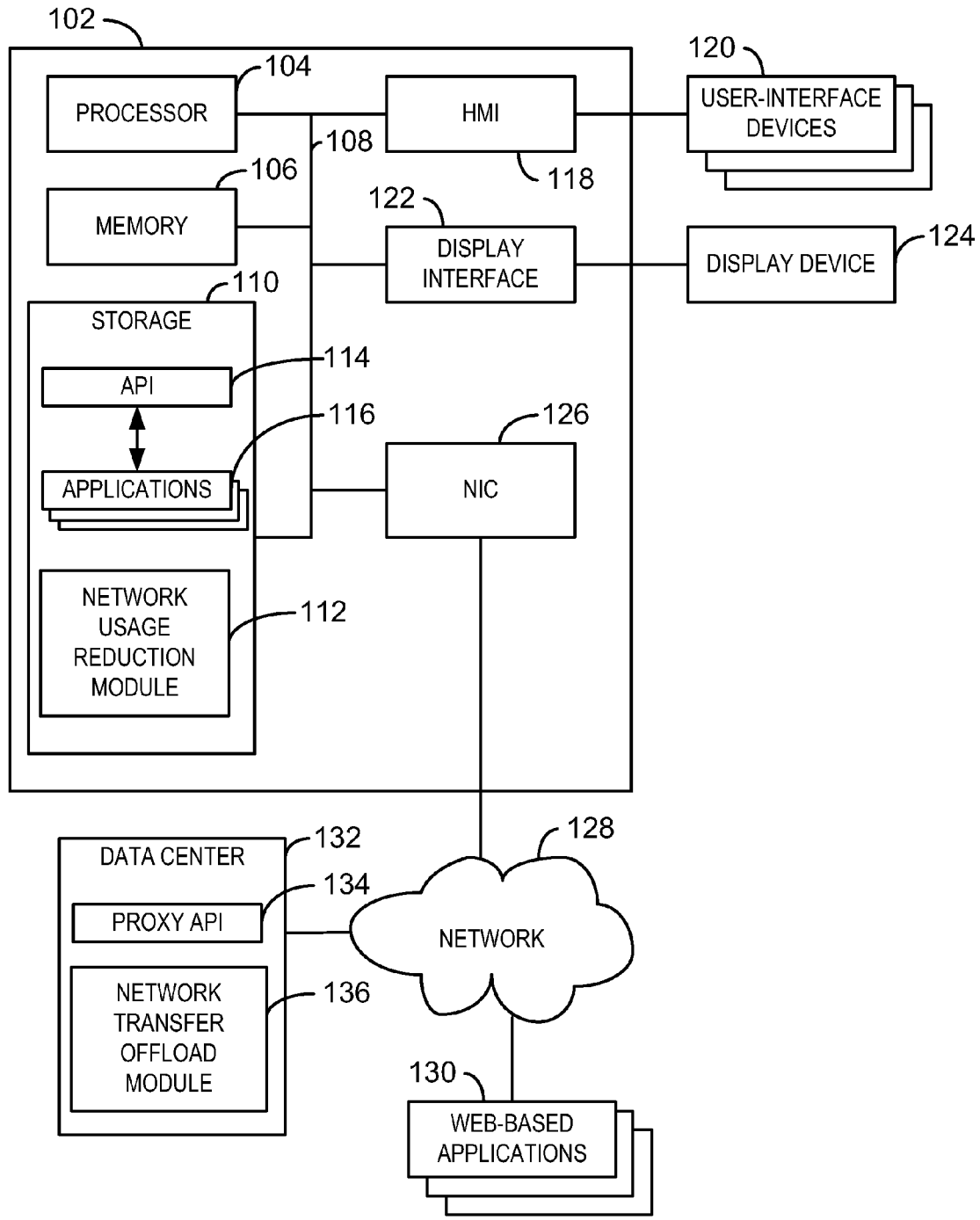
FIG. 1 is a block diagram of a computing environment that may be used to implement a method for reducing network usage.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of a computing environment 100 that may be used to implement a method for reducing network usage. The computing environment 100 may include a computing device 102. The computing device 102 may be, for example, a mobile phone, a tablet, a desktop computer, a laptop computer, an electronic reader, a television, a media player, or the like. The computing device 102 may include a processor 104 that is adapted to execute stored instructions, as well as a memory device 106 that stores instructions that are executable by the processor 104. The processor 104 may be a single core processor, a multi-core processor, a computing cluster, or any number of other configurations. The memory device 106 can include random access memory (RAM), read only memory (ROM), flash memory, or any other suitable memory systems. The stored instructions executed by the processor 104 may implement a method for reducing the network usage of the computing device 102 by procrastinating or eliminating network transfers. The processor 104 may be connected through a bus 108 to one or more input and output devices.

The computing device 102 may include a storage device 110. The storage device 110 may include a hard drive, an optical drive, a thumbdrive, an array of drives, or the like. The storage device 110 may be adapted to store a network usage reduction module 112. Moreover, the storage device 108 may also be adapted to store an API 114 and any number of applications 116. The applications 116 may communicate with each other via the API 114. The network usage reduction module 112 may be used to reduce network usage of the computing device 102 by analyzing network calls relating to network transfers that are sent to the API 114 from any of the applications 116, and procrastinating or eliminating network transfers that are not relevant to the current state of the application 116.

A human-machine interface (HMI) 118 may connect the computing device 102 to any number of user-interface devices 120, such as a touchscreen, a speaker, a pointing device, or the like. The computing device 102 may be linked through the bus 106 to a display interface 122 adapted to connect the computing device 102 to a display device 124. The display device 124 may include a computer monitor or a display screen of a mobile device, among others.

A network interface controller (NIC) 126 may be adapted to connect the computing device 102 through the bus 108 to a network 128. Through the network 128, Web-based applications 130 may be downloaded and stored within the computer's storage device 110, or may be accessed through a Web browser. The Web-based applications 130 may be stored on a remote server or computing device, for example.

The computing device 102 may also be communicably coupled to a datacenter 132 through the network 128. The datacenter 132 may include any suitable types of computing devices, such as desktop computers, laptop computers, Web servers, cloud servers, or the like. The datacenter 132 may be adapted to reduce the network usage of the computing device 102 via a proxy API 134 that may be used in place of the API 114 on the computing device 102. In addition, the datacenter 132 may be adapted to reduce the network usage of the computing device 102 via a network transfer offload module 136. For example, in various embodiments, the network usage reduction module 112 may transfer a network call from an application 116 to the proxy API 134, or may offload the network call to the network transfer offload module 136. The proxy API 134 or the network transfer offload module 136 may then reduce the network usage of the computing device 102 by eliminating network transfers that are not relevant to the current state of the requesting application 116. Alternatively, the proxy API 134 or the network transfer offload module 136 may reduce the network usage of the computing device 102 by reducing the size of networks transfers based on which portions of the network transfers are relevant to the current state of the application 116.

The block diagram of FIG. 1 is not intended to indicate that the computing environment 100 is to include all the components shown in FIG. 1. Further, the computing environment 100 may include any number of additional components not shown in FIG. 1, depending on the details of the specific implementation.

Figure 2:
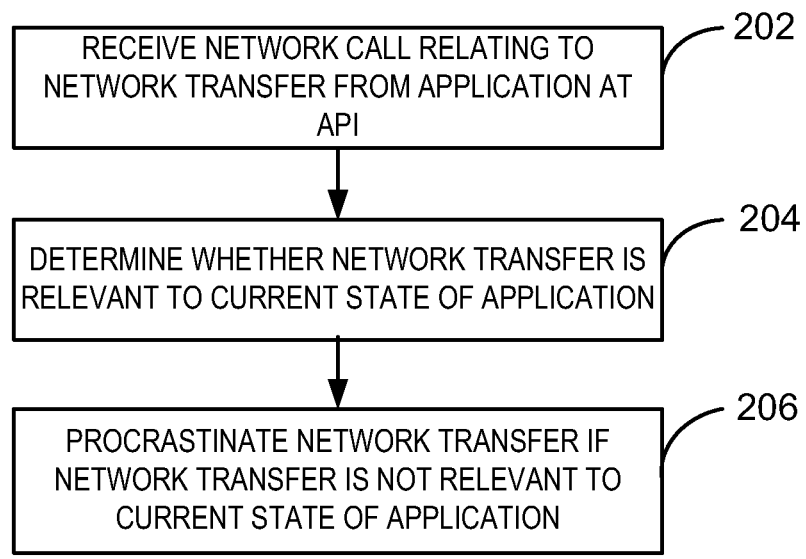
FIG. 2 is a process flow diagram of a method for reducing network usage by procrastinating network transfers.

FIG. 2 is a process flow diagram of a method 200 for reducing network usage by procrastinating network transfers. The method 200 may be implemented within the computing environment 100 discussed above with respect to FIG. 1. For example, the method 200 may be implemented via the API 114 of the computing device 102 in response to network calls received from any of the applications 116 residing within the computing device 102.

The method 200 begins at block 202, at which a network call relating to a network transfer is received from an application at the API of a computing device. The network call may include specific code received from the application that is used to direct the execution of the network transfer.

At block 204, it is determined whether the network transfer is relevant to a current state of the application. In some embodiments, the network transfer is considered to be relevant to the current state of the application if it updates a part of the application's UI that is currently visible to the user. For example, if the network transfer corresponds to a page of the application that is currently open, it may be considered to be relevant to the current state of the application. In addition, the network transfer may be considered to be relevant to the current state of the application if procrastination of the network transfer would have an effect on the functioning of the application. For example, if the network transfer relates to the transfer of audio files that are used as background music for the application, procrastinating the network transfer would have an effect on the functioning of the application.

At block 206, the network transfer is procrastinated if it is not relevant to the current state of the application. The network transfer may be procrastinated for a specified amount of time. In some embodiments, the network transfer is procrastinated for a fixed amount of time. If the user quits the application within the fixed amount of time, the network transfer may never occur or be terminated, resulting in the reduction of network usage by the application.

In other embodiments, the network transfer is procrastinated for a variable amount of time, such as until it becomes relevant to the current state of the application. For example, the network transfer may be procrastinated until it is relevant to a part of the application's UI that is currently visible to the user. Further, in some embodiments, the network call may be analyzed to determine specific portions of the network transfer that are relevant to the current state of the application, and only those portions of the network transfer may be executed, as discussed further below with respect to FIGS. 3 and 4.

The process flow diagram of FIG. 2 is not intended to indicate that the steps of the method 200 are to be executed in any particular order, or that all of the steps of the method 200 are to be included in every case. Further, any number of additional steps may be included within the method 200, depending on the details of the specific implementation.

In some embodiments, the user of the computing device may be made aware of the network usage of the computing device, and may be allowed to adjust the procrastination procedure accordingly. For example, the computing device may display the available network usage of the computing device based on the user's specific data plan, and the user may then adjust the procrastination procedure accordingly via a UI. In some cases, the user may shorten or lengthen the specified amount of time that network transfers are procrastinated, or may change the criteria for determining whether network transfers are to be procrastinated, for example. Further, in some embodiments, the computing device automatically adjusts the procrastination procedure based on the network usage of the computing device without input from the user.

Further, in some embodiments, the method 200 may include dynamically monitoring the application to determine which UI elements are visible to the user. A network transfer may then be executed immediately if the data corresponding to the network transfer updates a currently-visible UI element.

Figure 3:
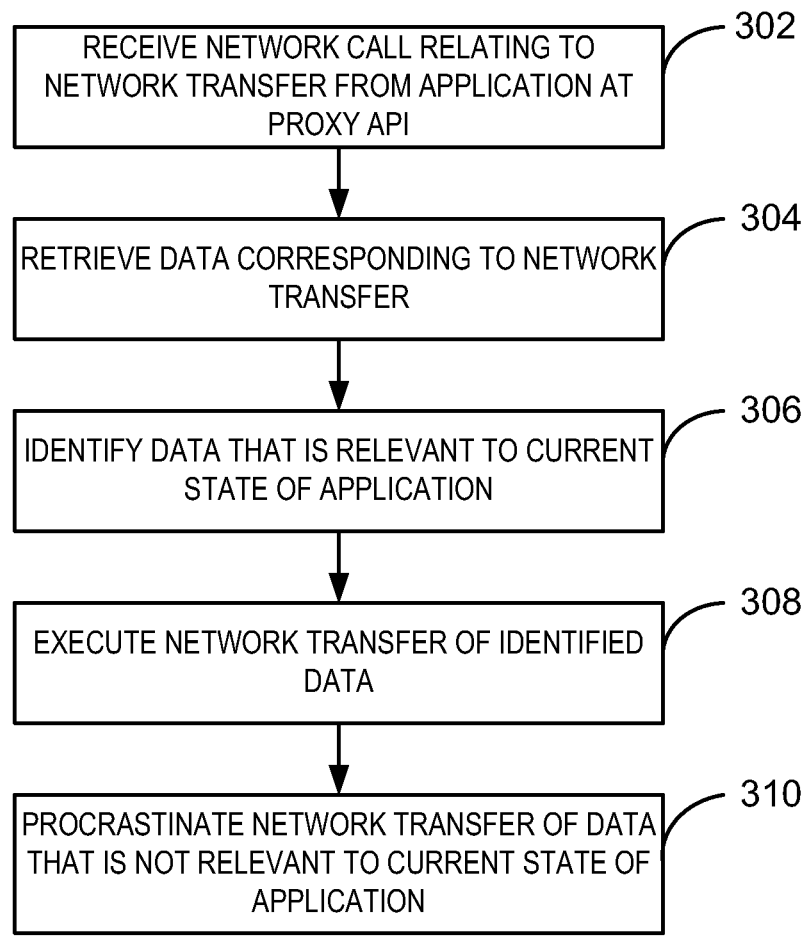
FIG. 3 is a process flow diagram of a method for reducing network usage via a proxy API.

FIG. 3 is a process flow diagram of a method 300 for reducing network usage via a proxy API. The method 300 may be implemented within the computing environment 100 discussed above with respect to FIG. 1. For example, the method 300 may be implemented using the proxy API 134 obtained from the datacenter 132 in place of the API 116 of the computing device 102. In some embodiments, the application developer may rewrite the application such that it utilizes the proxy API for network transfers instead of the original API of the computing device.

The method begins at block 302, at which a network call relating to a network transfer is received from an application at the proxy API. The network call may include specific code received from the application that is used to direct the execution of the network transfer.

At block 304, the data corresponding to the network transfer are retrieved by the proxy API. The proxy API may retrieve the data from a datacenter without transferring the data to the computing device hosting the requesting application.

At block 306, data that are relevant to a current state of the application are identified. Data may be considered to be relevant to the current state of the application if the data updates a part of the application's UI that is currently visible to the user, or if procrastination of the transfer of the data would have an effect on the functioning of the application, as discussed above with respect to FIG. 2. The identified data may include data that are to be sent back to the computing device, while the remainder of the data may include data that are not to be sent back to the computing device since they are not relevant to the current state of the application.

At block 308, the network transfer of the identified data is executed. In other words, the identified data may be transferred to the computing device. The network transfer may be executed by the proxy API, and the result may be sent to the application that initiated the network call.

At block 310, the network transfer of the data that are not relevant to current state of the application is procrastinated. In some embodiments, the network transfer of such data is procrastinated until the data becomes relevant to the current state of the application. In other embodiments, the network transfer of such data is simply terminated, and the data is discarded. For example, an application may be a weather channel application that is requesting the weather for every state in the country, and the user may only be interested in the weather for one designated state. In such instances, the proxy API may retrieve the data relating to the weather for the designated state and discard the data relating to the weather for the other states. This may reduce the overall network usage of the application by preventing the network transfer of irrelevant data.

The process flow diagram of FIG. 3 is not intended to indicate that the steps of the method 300 are to be executed in any particular order, or that all of the steps of the method 300 are to be included in every case. Further, any number of additional steps may be included within the method 300, depending on the details of the specific implementation. For example, in various embodiments, the steps of blocks 308 and 310 are executed in parallel.

Figure 4:
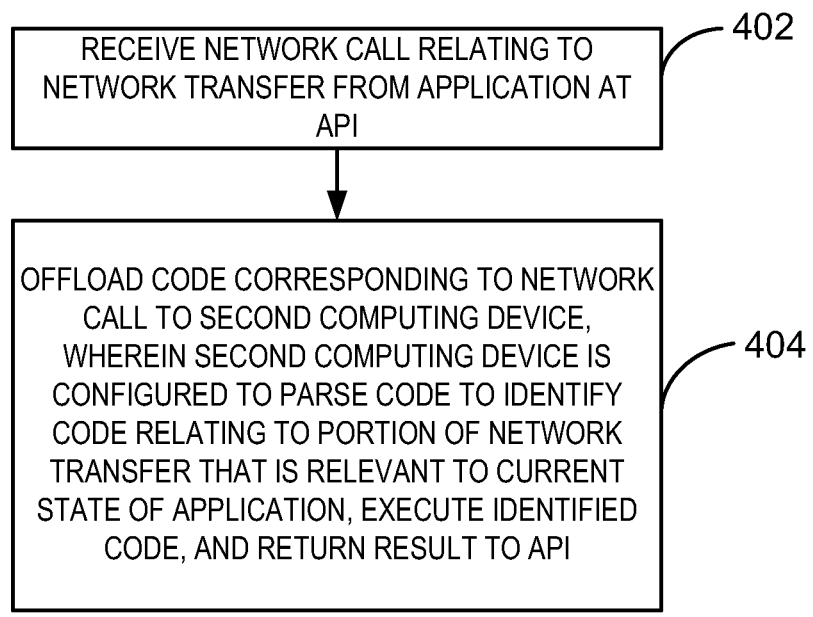
FIG. 4 is a process flow diagram of a method for reducing network usage via a network offload procedure.

FIG. 4 is a process flow diagram of a method 400 for reducing network usage via a network offload procedure. The method 400 may be implemented within the computing environment 100 discussed above with respect to FIG. 1. For example, the method 400 may be implemented via the API 114 of the computing device 102 in response to network calls received from any of the applications 116 residing within the computing device 102.

The method begins at block 402, at which a network call relating to a network transfer is received from an application at the API of a computing device. The API of the computing device may be communicably coupled to a network transfer offload module within a second computing device, such as the network transfer offload module 136 within the datacenter 132 discussed above with respect to FIG. 1.

At block 404, code corresponding to the network call is offloaded to a second computing device. More specifically, the network transfer offload module of the second computing device may intercept the network call before it is executed by the API of the computing device. The second computing device may be any suitable type of computing device, such as the datacenter 132 discussed above with respect to FIG. 1.

The second computing device may be configured to parse the code to identify code relating to a portion of the network transfer that is relevant to a current state of the application. The second computing device may also be configured to execute the identified code and return the resulting data to the API of the computing device. The code relating to the remaining portion of the network transfer that is not relevant to the current state of the application may be discarded, or may be procrastinated for a specified amount of time. Thus, the amount of data that is transferred to the computing device may be reduced.

The process flow diagram of FIG. 4 is not intended to indicate that the steps of the method 400 are to be executed in any particular order, or that all of the steps of the method 400 are to be included in every case. Further, any number of additional steps may be included within the method 400, depending on the details of the specific implementation.

The methods 200, 300, and 400 described above may provide for energy savings for the computing device. For example, the network interface of the computing device consumes battery power. Thus, reducing the amount of data transferred via the network interface may reduce the power consumption of the computing device, leading to a longer battery lifetime.

In various embodiments, the methods 200, 300, and 400 described above for procrastinating network transfers may be performed via binary rewriting of the code, e.g., the intermediate bytecode, of the application. Such a technique of binary rewriting of the application code is discussed further below with respect to FIG. 5.

Further, in some embodiments, the methods 200, 300, and 400 described above for procrastinating network transfers may be adjusted based on the typical usage of the requesting application. For example, it may be determined that users are likely to visit the second page of the application, and that users who visit the third page of the application are likely to visit the fourth page of the application. Thus, when a user launches an application and is on the first page, network transfers relating to the second page may still be performed even though the second page is not currently visible to the user. Network transfers relating to the third and fourth pages may be procrastinated because the user may not be likely to visit those pages. However, if the user visits the third page of the application, network transfer relating to the fourth page may then be performed since the user is likely to visit the fourth page after visiting the third page. This procedure may allow for the application to function at a higher speed, since network transfers that are likely to be relevant in the near future are not procrastinated.

Figure 5:
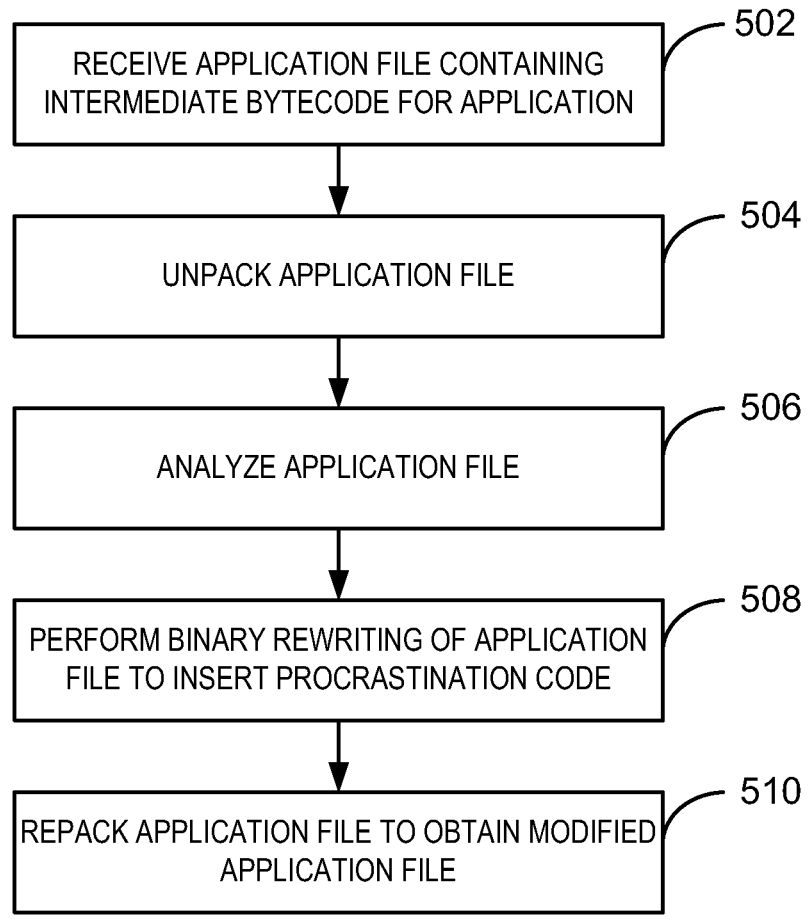
FIG. 5 is a process flow diagram of a method for binary rewriting of an application file that may be used to procrastinate network transfers.

FIG. 5 is a process flow diagram of a method 500 for binary rewriting of an application file that may be used to procrastinate network transfers. In various embodiments, the method 500 is used to insert code that results in the procrastination of network transfers, referred to herein as "procrastination code" into the application file. The method begins at block 502, at which an application file containing the intermediate bytecode for a particular application is received. The application file may be in any type of file, such as, for example, a zipped file. In addition, the application file may be a binary file.

At block 504, the application file is unpacked. Once the application file has been unpacked, the application manifest, which may include metadata files and property files, for example, may be located within the unpacked application file.

At block 506, the application file is analyzed to determine which functions within the code correspond to the transfer of data. In addition, the application file may be analyzed to determine which portions of the code relate to a current state of the application. For example, portions of the code that relate to a UI that is currently visible to the user may be identified.

At block 508, binary rewriting of the application file is performed to insert procrastination code. The insertion of the procrastination code may provide for the procrastination of network transfers that do not relate to the current state of the application. For example, procrastination code may be inserted into the functions that correspond to the transfer of data, and the application may be dynamically monitored to determine which procrastination code to activate at any point in time.

At block 510, the application file is repacked to obtain a modified application file. The modified application file may provide for the reduction of the network usage of the application.

The process flow diagram of FIG. 5 is not intended to indicate that the steps of the method 500 are to be executed in any particular order, or that all of the steps of the method 500 are to be included in every case. Further, any number of additional steps may be included within the method 500, depending on the details of the specific implementation. For example, if a function within the code that does not update the UI directly but rather stores the result in a global variable is identified, access to the global variable may be rewritten. The global variable may be rewritten such that the next time any code accesses the global variable, the network transfer may be performed synchronously, and execution of the application may continue.

Figure 6:
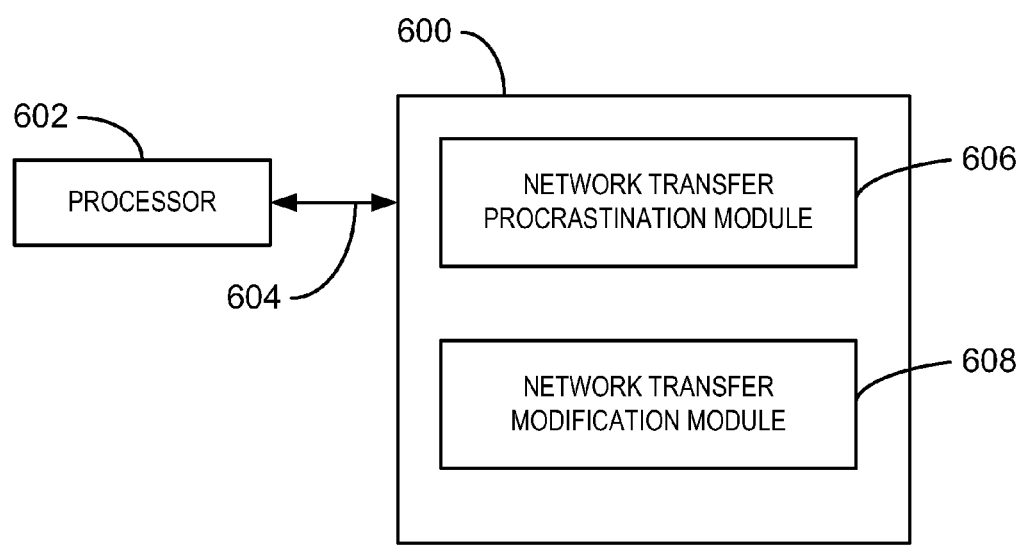
FIG. 6 is a block diagram showing a computer-readable storage medium that stores code adapted to implement a method for reducing network usage.

FIG. 6 is a block diagram showing a computer-readable storage medium 600 that stores code adapted to implement a method for reducing network usage. The computer-readable storage medium 600 may be accessed by a processor 602, for example, over a computer bus 604. Furthermore, the computer-readable storage medium 600 may include code configured to direct the processor 602 to perform the steps of the current method. The various software components described herein may be stored on the computer-readable storage medium 600, as indicated in FIG. 6. For example, a network transfer procrastination module 606 may be adapted to procrastinate a network transfer if the network transfer is not relevant to the current state of the requesting application. In addition, a network transfer modification module 608 may be adapted to modify a network transfer such that only portions of the network transfer that are relevant to the current state of the requesting application are performed, while the remaining portions of the network transfer are procrastinated or terminated. Further, the computer-readable storage medium 600 may also include any number of additional software components not shown in FIG. 6.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for reducing network usage of a computing device, comprising:
    receiving a network call relating to a network transfer from an application at an application programming interface of the computing device;
    determining whether the network transfer is relevant to a current state of the application;
    procrastinating the network transfer via binary rewriting of intermediate bytecode of the application when the network transfer is not relevant to the current state of the application, wherein the binary rewriting of intermediate bytecode of the application further comprises inserting procrastination code into an application file of the application; and
    when at least a portion of the network transfer is relevant to the current state of the application:
        offloading code of the network call to a second computing device; and
        receiving a result of the network call from the second computing device, wherein the second computing device is configured to parse the code to identify code relating to a portion of the network transfer that is relevant to the current state of the application, execute the identified code, and return the result to the application programming interface.

2. The method for claim 1, comprising procrastinating the network transfer for a specified amount of time.

3. The method for claim 1, comprising:
    procrastinating a portion of the network transfer that is related to a user interface of the application that is not currently visible to a user; and
    executing the portion of the network transfer when the user interface becomes visible to the user.

4. The method for claim 1, comprising determining whether to procrastinate each portion of the network transfer based on whether procrastination of each portion will have an effect on a functioning of the application.

5. The method for claim 1, comprising determining whether to continue procrastinating the network transfer based at least in part on an available network usage for the computing device.

6. The method for claim 1, comprising, when at least a portion of the network transfer is relevant to the current state of the application, using a proxy application programming interface residing outside the computing device to retrieve all data corresponding to the network transfer, identify data that is relevant to the current state of the application, and transfer the identified data to the computing device.

7. A computing system for reducing network usage, comprising:
    a processor that is adapted to execute stored instructions; and
    a system memory, wherein the system memory comprises code configured to:
        analyze a network call from an application to determine whether each portion of a corresponding network transfer is relevant to a current state of the application;
        procrastinate the network transfer via binary rewriting of intermediate bytecode of the application when the network transfer is not relevant to the current state of the application, wherein the binary rewriting of intermediate bytecode of the application further comprises inserting procrastination code into an application file of the application; and
        when at least a portion of the network transfer is relevant to the current state of the application:
            offload code of the network call to a datacenter; and
            receive a result of the network call from the datacenter, wherein the datacenter is configured to parse the code to identify code relating to a portion of the network transfer that is relevant to the current state of the application, execute the identified code, and return the result to the computing system.

8. The computing system of claim 7, wherein the system memory comprises code configured to procrastinate the network transfer for a specified amount of time.

9. The computing system of claim 7, wherein the system memory comprises code configured to:
    procrastinate a portion of the network transfer that is related to a user interface of the application that is not currently visible to a user; and
    execute the portion of the network transfer when the user interface becomes visible to the user.

10. The computing system of claim 7, wherein the system memory comprises code configured to, when at least a portion of the network transfer is relevant to the current state of the application, use a proxy application programming interface residing outside the computing system to retrieve all data corresponding to the network transfer, identify data that is relevant to the current state of the application, and transfer the identified data to the computing system.

11. The computing system of claim 7, wherein the system memory comprises code configured to determine whether to procrastinate each portion of the network transfer based on whether procrastination of each portion will have an effect on a functioning of the application.

12. A method for reducing network usage of a computing device, comprising:
    receiving a network call relating to a network transfer from an application at an application programming interface of the computing device;
    determining whether the network transfer is relevant to a current state of the application;
    procrastinating the network transfer via binary rewriting of intermediate bytecode of the application when the network transfer is not relevant to the current state of the application, wherein the binary rewriting of intermediate bytecode of the application further comprises:
        unpacking an application file of the application;

analyzing the application file to determine which function within the code corresponds to the network transfer and which portions of the code relate to the current state of the application;
performing binary rewriting of the application file to insert procrastination code; and
repacking the application to obtain a modified application file; and when at least a portion of the network transfer is relevant to the current state of the application:
offloading code of the network call to a second computing device; and
receiving a result of the network call from the second computing device, wherein the second computing device is configured to parse the code to identify code relating to a portion of the network transfer that is relevant to the current state of the application, execute the identified code, and return the result to the application programming interface.

* * * * *